UNITED STATES PATENT OFFICE.

ANTONIO PELLETIER, OF WASHINGTON, DISTRICT OF COLUMBIA.

IMPROVEMENT IN COMPOSITIONS FOR ARTIFICIAL STONE, TILE, PAVEMENT, &c.

Specification forming part of Letters Patent No. 136,862, dated March 18, 1873.

*To all whom it may concern:*

Be it known that I, ANTONIO PELLETIER, of Washington, in the county of Washington and District of Columbia, have invented certain new and useful Improvements in Compositions of Matter for Tiles, Pavements, and other purposes; and I hereby declare that the following is a full description thereof.

My invention relates to improvements in compositions of matter for which Letters Patent were granted me numbering as follows: No. 63,087, No. 71,210, No. 73,643, No. 74,587, No. 76,806, and No. 77,705; and consists, principally, in new modifications of some of said compositions in order better to adapt the new composition to the purposes intended. My invention consists in a new composition of matter intended for pavements, tiles, and various other purposes, the same being composed of certain proportions of Portland cement, oxide of zinc, sharp sand, and lime paste, properly mixed and molded, and, when partly dry, treated with solutions of the chloride of zinc or chloride of lime in a special manner.

In the preparation of my new composition I take, say, about one-fourth part Portland cement, one-fourth part oxide of zinc, one-third part sharp sand, and one-sixth part lime paste. Mix the whole thoroughly together, and mold immediately, before the material has time to set. When the molded article is half dry wash the same or immerse in a bath of chloride of zinc, or in a bath of chloride of calcium when it is desirable to increase the quantity of lime in order to give greater strength.

For preparing white stone or other white article, use white sand. Other metallic oxides may be used in place of the oxide of zinc for the purpose of changing the color.

This composition may be used for sidewalks, tiles, steps, window-sills, cornices, tombstones, mantels, garden-vases, and statues, and for various other similar purposes.

I do not herein broadly claim a mixture of Portland cement, oxide of zinc, sharp sand, and lime paste, either molded or not; but the composition prepared of said materials, mixed in about the proportions above mentioned, and then treated, as described, with chloride of zinc or chloride of lime, forms a new and useful composition for various purposes, as set forth.

Having described my invention, I claim—

The above-described composition of matter, formed of a mixture of Portland cement, oxide of zinc, or its equivalent oxide, sharp sand, and lime paste, in the proportions and molded as described, and when partly dry treated with a solution of the chloride corresponding to the oxide used in making the molded article, substantially as set forth.

ANTONIO PELLETIER.

Witnesses:
 EDM. F. BROWN,
 DANIEL BREED.